United States Patent
Yokoyama et al.

(10) Patent No.: US 9,862,855 B2
(45) Date of Patent: Jan. 9, 2018

(54) TRANSPARENT FILM, METHOD FOR USING THE SAME, AND TOUCH PANEL

(71) Applicant: DAICEL CORPORATION, Osaka-shi, Osaka (JP)

(72) Inventors: Aya Yokoyama, Amagasaki (JP); Hisayoshi Ito, Tokyo (JP)

(73) Assignee: DAICEL CORPORATION, Osaka-Shi (JP)

( * ) Notice: Subject to any disclaimer, the term of this patent is extended or adjusted under 35 U.S.C. 154(b) by 326 days.

(21) Appl. No.: 14/436,302

(22) PCT Filed: Oct. 17, 2013

(86) PCT No.: PCT/JP2013/078135
§ 371 (c)(1),
(2) Date: Apr. 16, 2015

(87) PCT Pub. No.: WO2014/061718
PCT Pub. Date: Apr. 24, 2014

(65) Prior Publication Data
US 2015/0291828 A1  Oct. 15, 2015

(30) Foreign Application Priority Data

Oct. 17, 2012 (JP) ................ 2012-229501
Jan. 9, 2013 (JP) ................ 2013-002034

(51) Int. Cl.
*G06F 3/041* (2006.01)
*C09D 133/14* (2006.01)
*C08J 7/04* (2006.01)

(52) U.S. Cl.
CPC ........... *C09D 133/14* (2013.01); *C08J 7/047* (2013.01); *G06F 3/041* (2013.01);
(Continued)

(58) Field of Classification Search
CPC ..... C09D 133/14; C08J 7/047; C08J 2367/02; C08J 2433/00; C08J 2301/12; G06F 3/041
See application file for complete search history.

(56) References Cited

U.S. PATENT DOCUMENTS

| 5,440,080 A | 8/1995 | Nagaoka et al. |
| 2010/0033818 A1* | 2/2010 | Petcavich ............... B08B 17/06 359/507 |

FOREIGN PATENT DOCUMENTS

| JP | 6-309090 A | 11/1994 |
| JP | 7-253504 A | 10/1995 |

(Continued)

OTHER PUBLICATIONS

International Search Report, issued in PCT/JP2013/078135, dated Jan. 28, 2014.
(Continued)

*Primary Examiner* — Laura A Auer
(74) *Attorney, Agent, or Firm* — Birch, Stewart, Kolasch & Birch, LLP

(57) ABSTRACT

A transparent film for a display is provided. The transparent film enables smooth writing in input operation using a pen-input touch panel, like writing on paper with a pencil. The transparent film comprises a transparent substrate film and a coat layer on at least one side of the transparent substrate film. The total light transmittance of the transparent film in accordance with JIS K7136 is adjusted to not lower than 85%, and the surface of the coat layer is adjusted to a maximum height of rolling circle waviness profile ($W_{EM}$) of not less than 15 μm in accordance with JIS B0610. The transparent film is disposed at the outermost side of a display in a pen-input touch panel. The coat layer may contain a particle and a binder component. The particle may have an average particle size of about 1 to 5 times as large (Continued)

as the thickness of the coat layer. The binder component may further contain a thermoplastic elastomer.

6 Claims, 9 Drawing Sheets

(52) U.S. Cl.
 CPC ........ *C08J 2301/12* (2013.01); *C08J 2367/02* (2013.01); *C08J 2433/00* (2013.01)

(56) References Cited

FOREIGN PATENT DOCUMENTS

| | | | |
|---|---|---|---|
| JP | 10172377 A * | 6/1998 | |
| JP | 2004-240548 A | 8/2004 | |
| JP | 2010-153298 A | 7/2010 | |
| WO | WO 03/067416 A1 | 8/2003 | |
| WO | WO 2012050240 A1 * | 4/2012 | ........... G02B 5/3025 |
| WO | WO 2012160894 A1 * | 11/2012 | .............. C08J 7/047 |

OTHER PUBLICATIONS

English translation of International Preliminary Report on Patentability and Written Opinion dated Apr. 30, 2015, in PCT International Application No. PCT/JP2013/078135.

* cited by examiner

[Fig. 1]
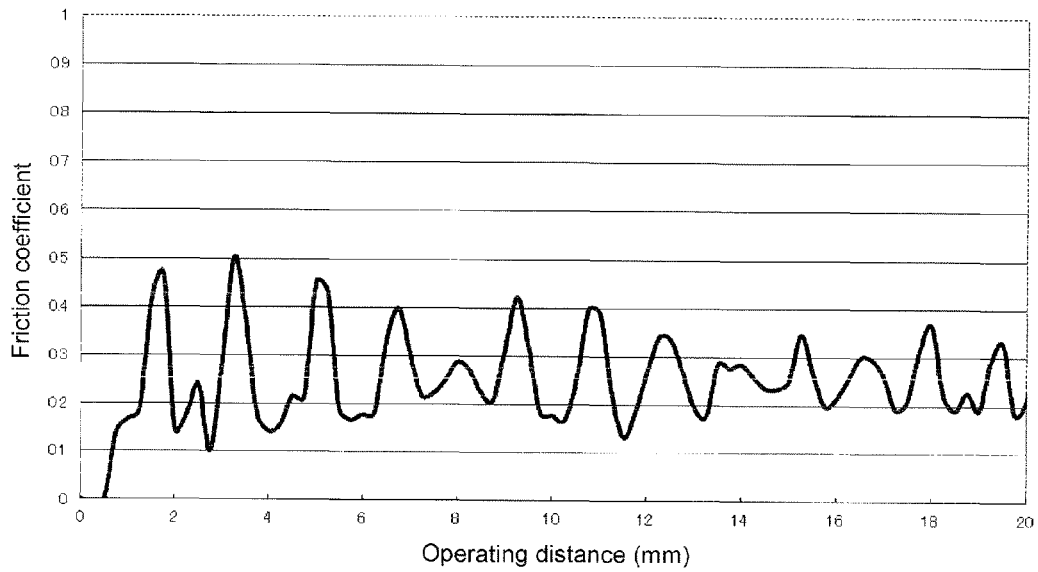
[Fig. 2]
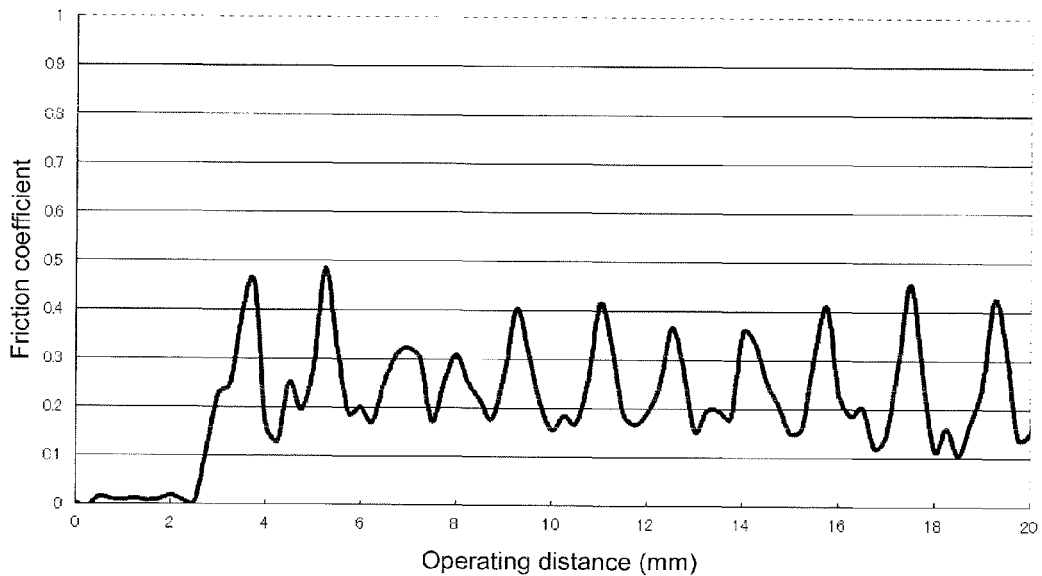

[Fig. 3]
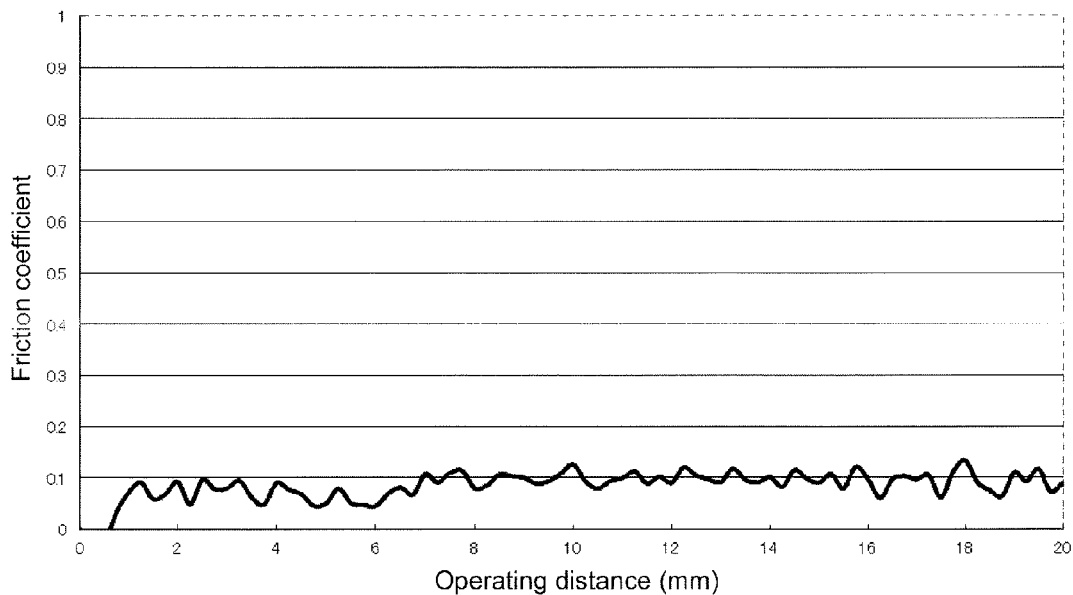
[Fig. 4]
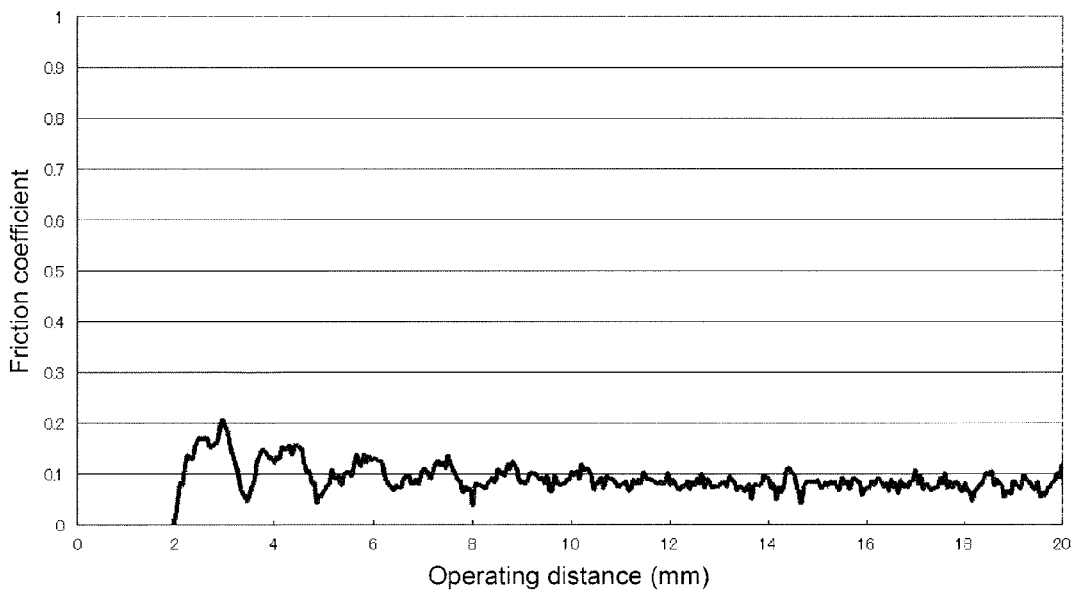

[Fig. 5]
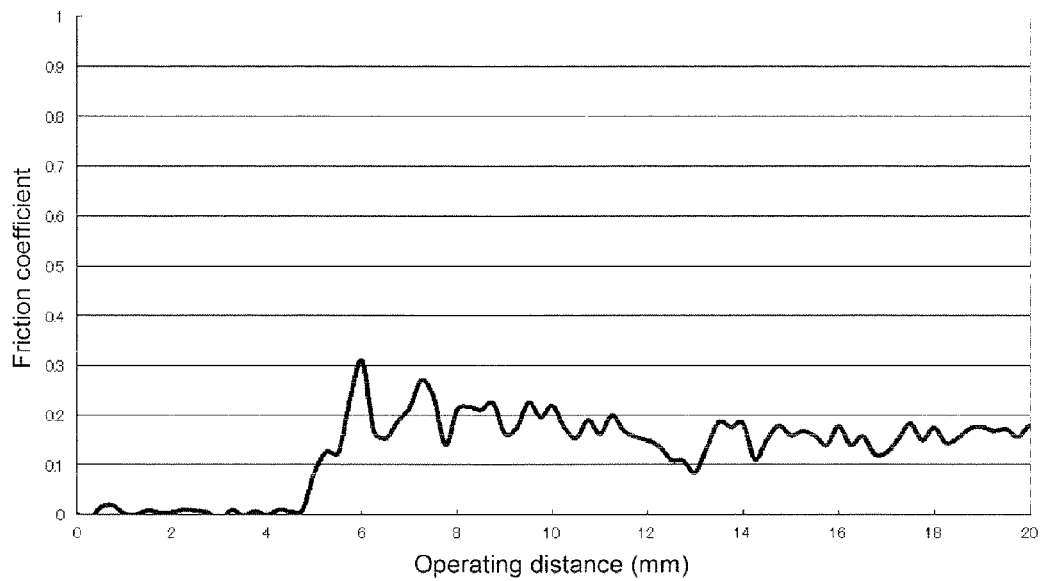
[Fig. 6]
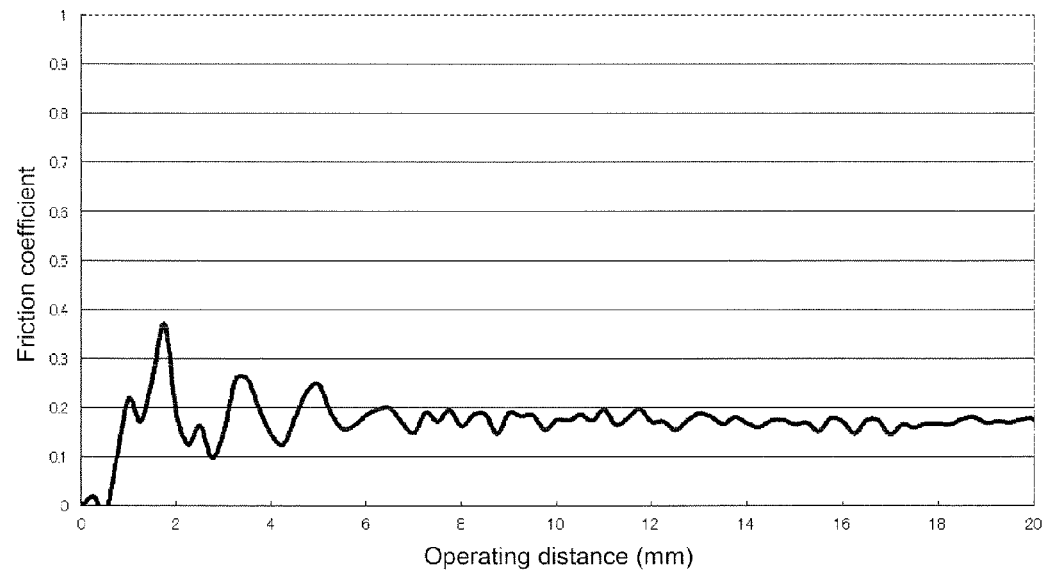

[Fig. 7]
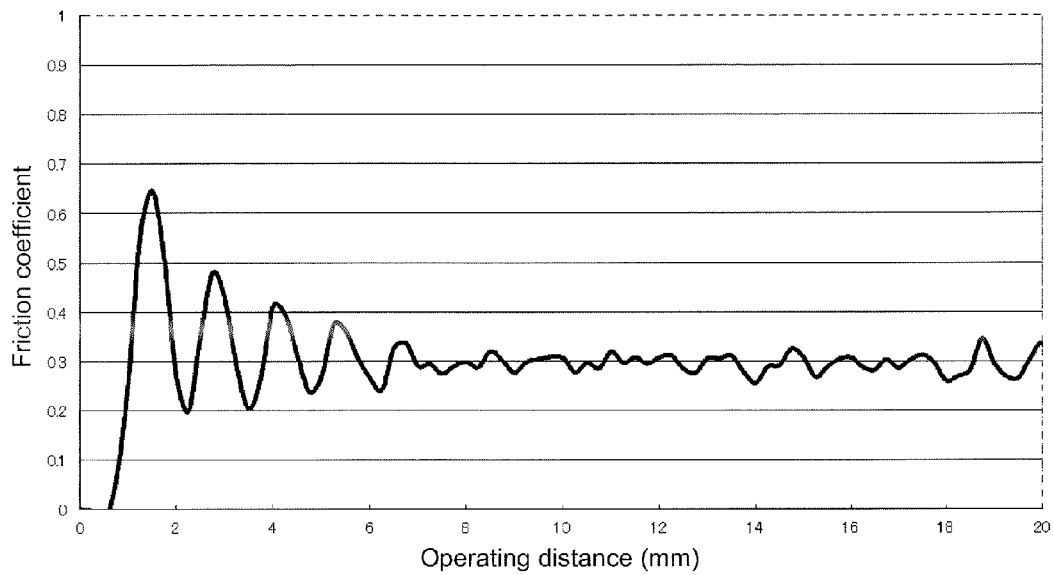
[Fig. 8]
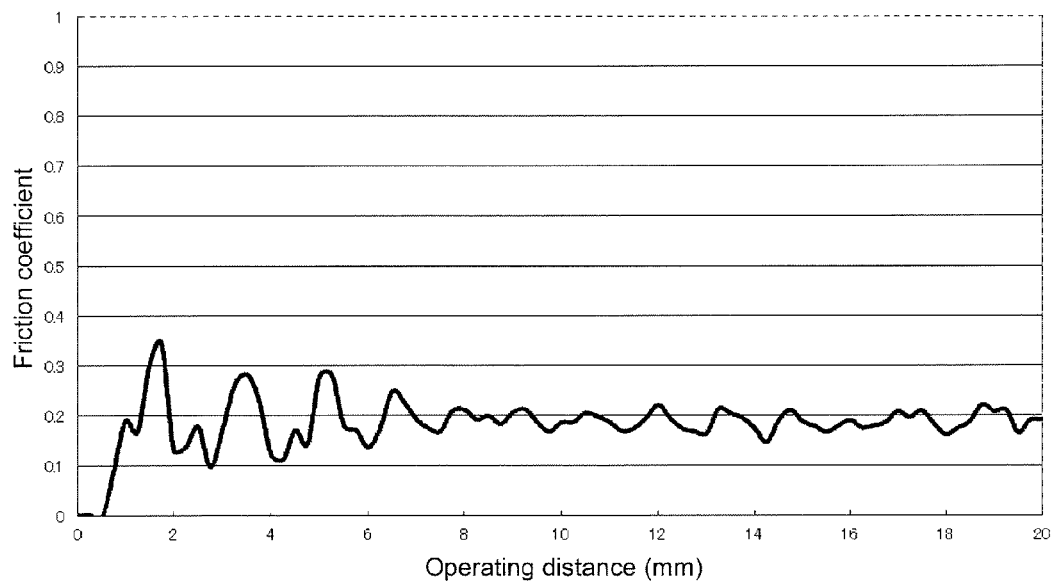

[Fig. 9]
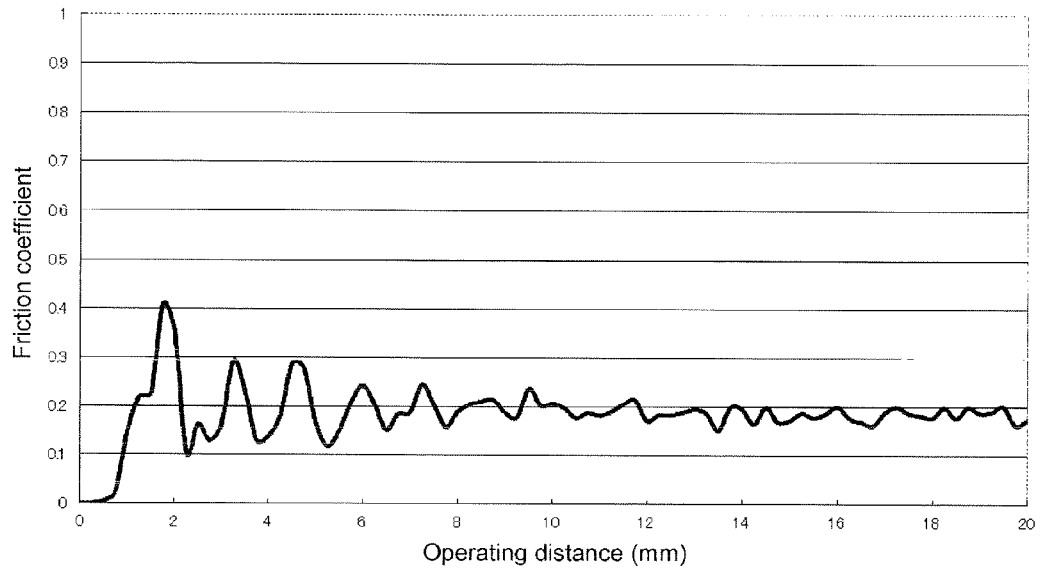
[Fig. 10]
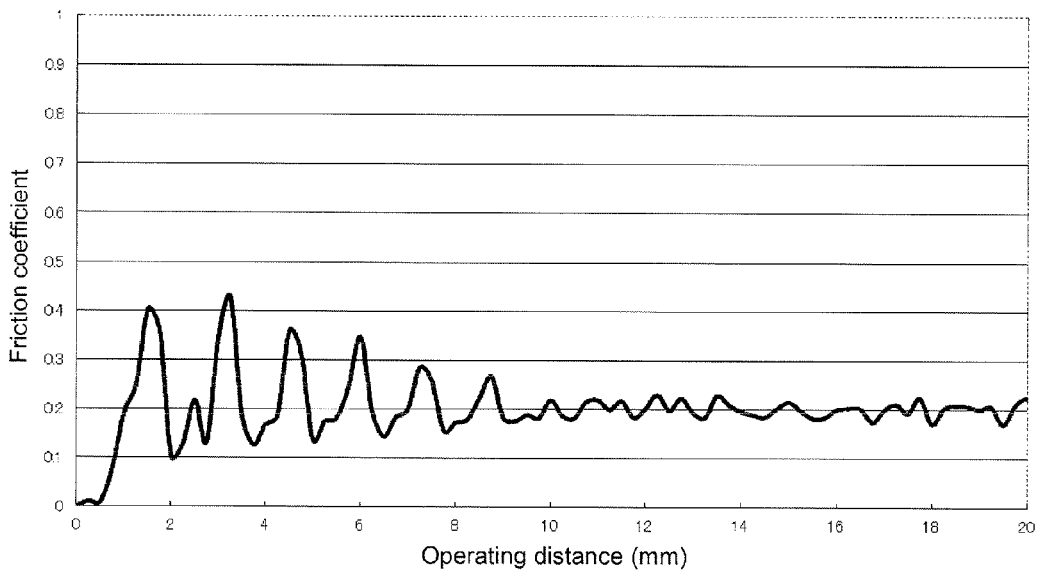

[Fig. 11]
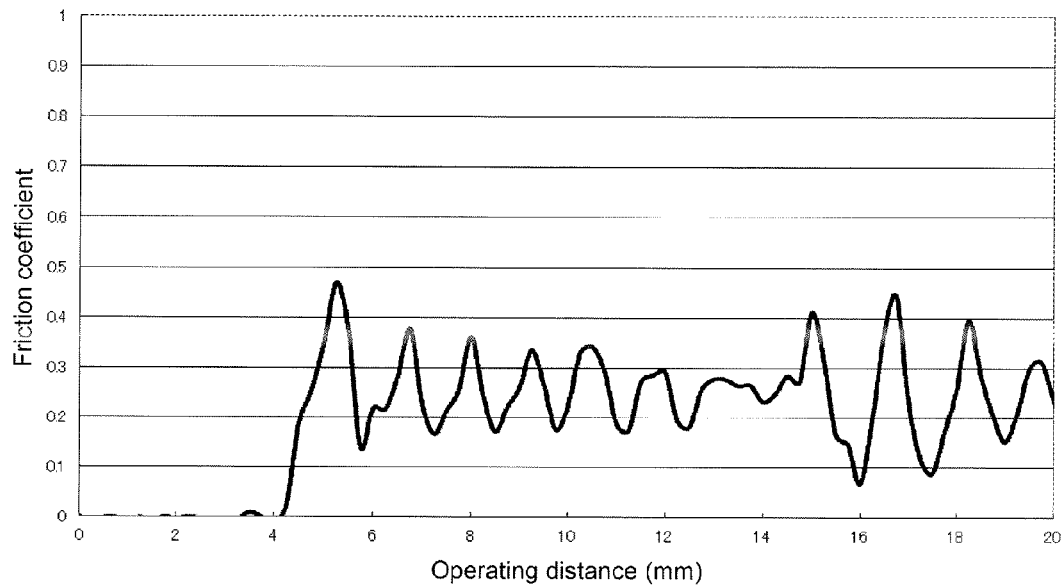
[Fig. 12]
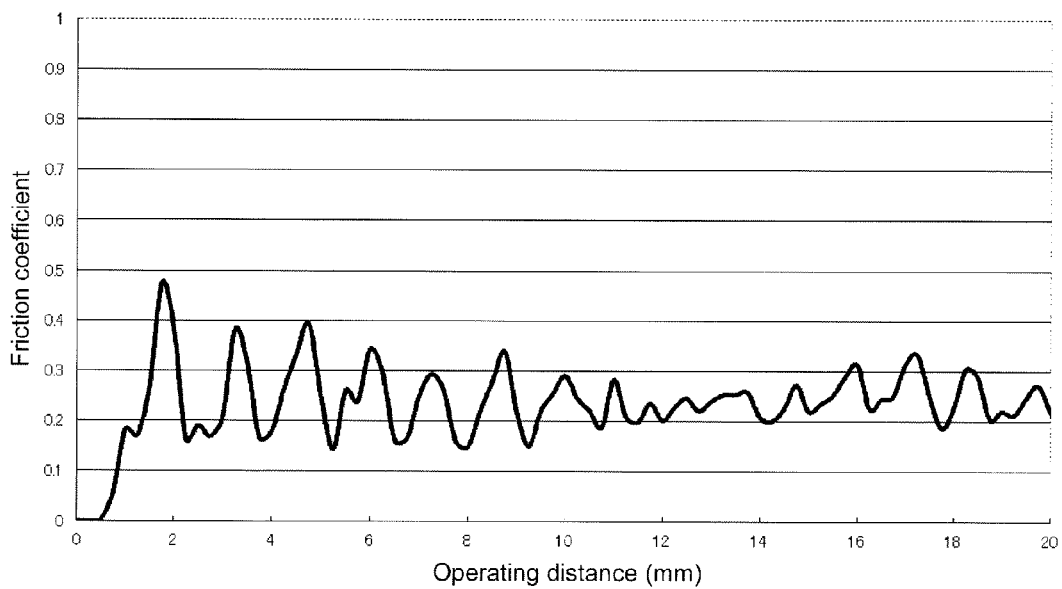

[Fig. 13]
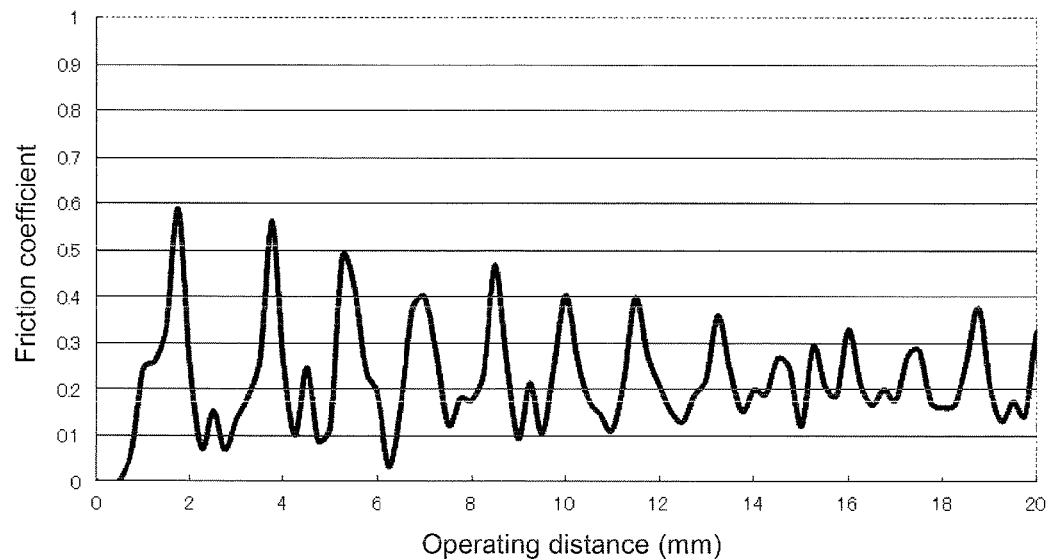
[Fig. 14]
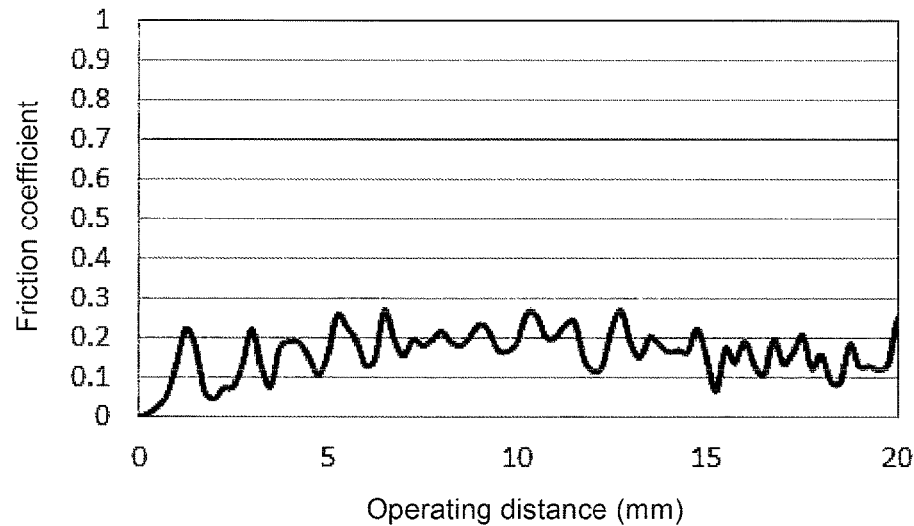

[Fig. 15]
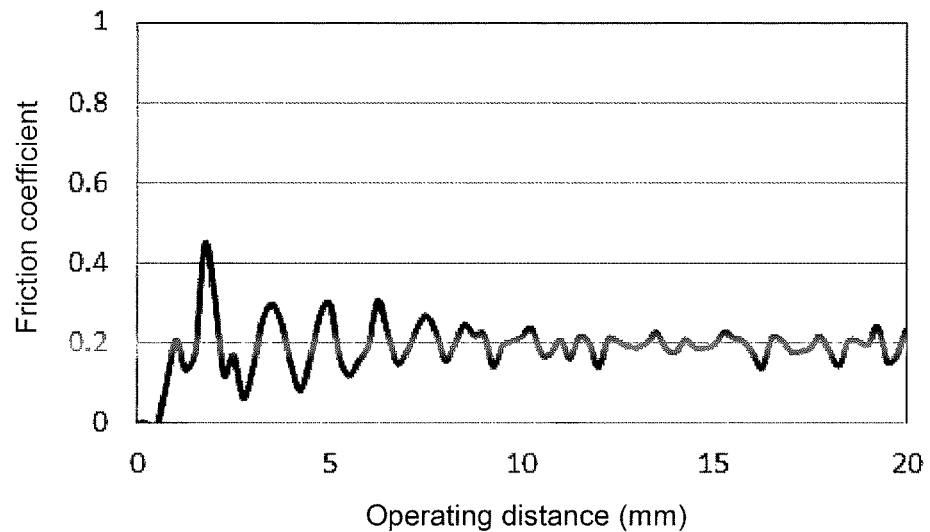
[Fig. 16]
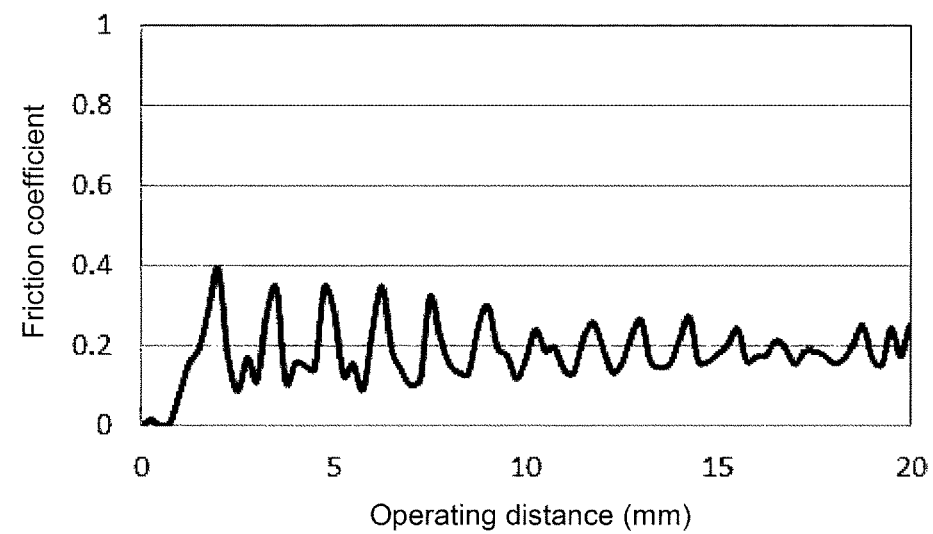

[Fig. 17]
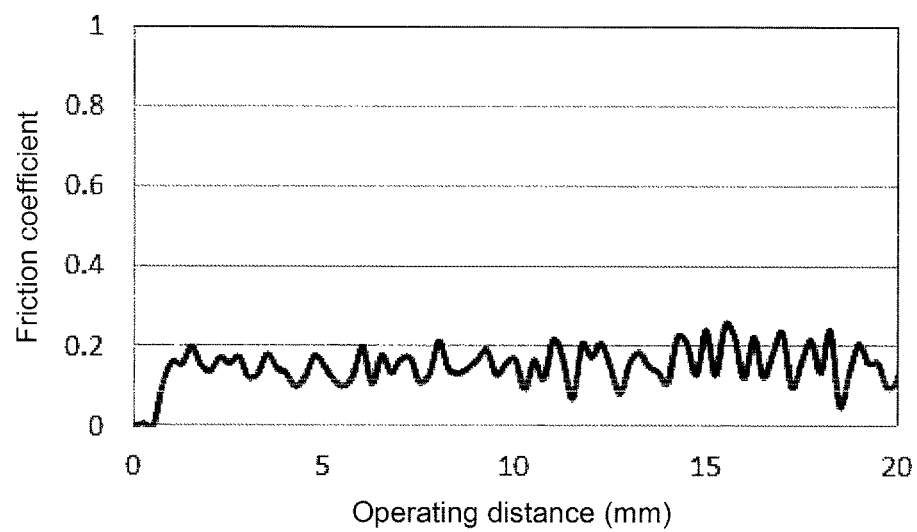

TRANSPARENT FILM, METHOD FOR USING THE SAME, AND TOUCH PANEL

TECHNICAL FIELD

The present invention relates to transparent films that are usable for displays of touchpanels or other devices and provide improved writing (or excellent touch) surfaces for pens (digital pens). The invention also relates to methods for using the transparent films, and pen-input touch panels.

BACKGROUND ART

A progress in an electronic display as man machine interface has resulted in popularization of an interactive input system. Among others, an apparatus in which a touch panel (a digitizer) is united with a display screen is widely used in various fields such as an ATM (automated teller machine), a merchandise management, an outworking (canvassing, selling), a guide sign, and an entertainment device. Since use of the touch panel in combination with a lightweight and thin display (e.g., a liquid crystal display) dispenses with any keyboard and exhibits the features of the display, the touch panel is increasingly used for mobile devices. The touch panel (or touch screen) is a device for inputting (or feeding) information or instructions to a computer by touching a prescribed area on the touch panel with an input means or device, such as a finger or a pen (a digital pen or a stylus). According to the position detection method, the touch panel can be classified into an optical system, an ultrasonic-wave system, a capacitive system, a resistive system, and other systems. Among these systems, the capacitive system detects the location of the touch using a change in capacitance. In light of excellent functionality, a projected capacitive touch panel of ITO grid system, which is now being used for mobile devices, is receiving a lot of attention. The mobile devices include a smartphone, a mobile phone, an electronic paper, a tablet personal computer (PC), a pen tablet (or a graphics tablet), and a game console. Among the capacitive touch panels, a pen-input touch panel, which uses a pen as an input device, is also now being widely used and being increasingly applied for a smartphone, an electronic paper, a tablet PC, a pen tablet, a game console, and a PC. The display of the touch panel (or touch screen) is provided with, on a surface thereof, a hardcoat film, an anti-Newton-ring film, a soft film, or other films according to purposes.

As the pen-input touch panel is widely used for various purposes, the touchpanel requires higher functions for enabling smooth or excellent writing in pen input, e.g., for enabling smooth or excellent writing similar to writing on paper with a pencil. Unfortunately, a touch panel provided with the soft film, which has an excessively strong resistance, never enables smooth writing similar to writing on paper with a pencil.

Meanwhile, for the hardcoat film or the anti-Newton-ring film, there has been reported a method for forming an uneven structure on a surface of the film to improve the finger touch (feel) of the film. Japanese Patent Application Laid-Open Publication No. 2010-153298 (JP-2010-153298A, Patent Document 1) discloses a laminated film for a touch panel, the laminated film comprising, in sequence, a hardcoat layer, a substrate consisting of a polyester film, and a transparent conductive layer consisting of a metal oxide. The hardcoat layer has an average area surface roughness of 0.08 to 0.30 μm, an average friction coefficient MIU of KES surface friction characteristic value of 0.13 to 0.17, and a fluctuation MMD of friction coefficient of 0.006 to 0.015. This document discloses a hardcoat liquid containing an acrylic hardcoat liquid and an inorganic or organic particle having an average particle size of 2 to 7 μm. Moreover, the document discloses that the ratio of the inorganic or organic particle is 0.5 to 20 parts by weight relative to 100 parts by weight of a cured resin and that the inorganic or organic particle preferably includes a porous silica-series fine particle having a pore volume of not smaller than 1.7 ml/g in light of transparency.

Since the hardcoat layer is formed from the fine particle and the crosslinkable polymer, the film has an improved finger touch to some degree. Unfortunately, for pen-input operation, a digital pen excessively slides on the film. In particular, the writing smoothness is irregular during pen-input operation (or the writing smoothness (or the feeling of writing) is not constant between the beginning and the midst of pen-input operation). Thus the film never enables smooth writing similar to writing on paper with a pencil.

RELATED ART DOCUMENTS

Patent Documents

Patent Document 1: JP-2010-153298A (Claim 1, paragraphs [0004] [0013] [0017])

SUMMARY OF THE INVENTION

Problems to be Solved by the Invention

It is therefore an object of the present invention to provide a transparent film for a display, a method for using the film, and a pen-input touch panel provided with the film; the film enables smooth writing similar to writing on paper with a pencil.

Another object of the present invention is to provide a transparent film for a display, a method for using the film, a pen-input touch panel provided with the film; the film has a substantially uniform (or constant) writing smoothness during pen-input operation (or between the beginning and the midst of pen-input operation).

It is still another object of the present invention to provide a transparent film for a display, a method for using the film, and a pen-input touch panel provided with the film; the film has a high transparency, a high hardness, and an excellent durability against repeated pen-input operations.

Means to Solve the Problem

The inventors of the present invention made intensive studies to achieve the above objects and finally found that a pen-input touch panel allows smooth (or excellent) input (or writing) of information with a pen (a stylus), like smooth writing on paper with a pencil, by adjusting the shape of projections (or the unevenness) on a surface of a coat layer contained in a transparent film, wherein the transparent film is disposed on a display (or screen) of the touch panel with the coat layer facing outward. The present invention was accomplished based on the above findings.

That is, an aspect of the present invention provides a transparent film (transparent laminated film) comprising a transparent substrate film and a coat layer on at least one side of the transparent substrate film. The transparent film has a total light transmittance (or a total luminous transmittance) in accordance with Japanese Industrial Standards (JIS) K7136 of not lower than 85%, and the coat layer has a surface (or a surface texture) with a maximum height of rolling circle waviness profile ($W_{EM}$) in accordance with JIS B0610 of not less than 15 μm. The coat layer may comprise a particle and a binder component. The particle may have an average particle size of about 1 to 5 times as large as a thickness of the coat layer. The particle may have a CV value of particle size of not larger than 20%. The maximum height of rolling circle waviness profile may be about 15 to 50 μm. The particle may comprise a crosslinked poly(meth) acrylic ester-series particle having an average particle size of not smaller than 10 μm. The coat layer may have a surface (or a surface texture) with about 30 to 200 (particularly, about 50 to 150) projections, each having a height of not less than 1.0 μm, per square millimeter ($mm^2$), and the projections may have an average height of about not less than 3.5 μm (particularly about 4 to 5 μm). The binder component may comprise a thermoplastic elastomer. The transparent substrate film may be formed from a poly(alkylene arylate)-series resin. According to an aspect of the present invention, the transparent film may have a haze of not more than 80%.

Another aspect of the present invention provides a method of using the transparent film for a display of a pen-input touch panel. A further aspect of the present invention provides a pen-input touch panel provided with the transparent film.

Effects of the Invention

According to the present invention, the transparent film, which contains a coat layer having a surface having projections with controlled shapes, is disposed on a pen-input touch panel display with the coat layer facing outward, and the writing smoothness of the transparent film (the profile of friction coefficient versus operating distance of a pen on the film) remains substantially constant between the beginning and the midst of pen-input operation, so that the transparent film allows smooth input of information with a digital pen similar to writing on paper with a pencil. Thus the transparent film enables delicate pen-input operation and is also applicable to a highly functional pen-input touch panel. Further, the transparent film has a high transparency, a high hardness, and an improved durability against repeated pen-input operations.

BRIEF DESCRIPTION OF DRAWINGS

FIG. 1 is a graph showing a profile of friction coefficient versus operating distance of a 6B pencil slid on a paper.

FIG. 2 is a graph showing a profile of friction coefficient versus operating distance of a HB pencil slid on a paper.

FIG. 3 is a graph showing a profile of friction coefficient versus operating distance of a digital pen slid on a commercially available hardcoat film of Comparative Example 1.

FIG. 4 is a graph showing a profile of friction coefficient versus operating distance of a digital pen slid on a transparent film obtained in Comparative Example 2.

FIG. 5 is a graph showing a profile of friction coefficient versus operating distance of a digital pen slid on a transparent film obtained in Comparative Example 3.

FIG. 6 is a graph showing a profile of friction coefficient versus operating distance of a digital pen slid on a transparent film obtained in Comparative Example 4.

FIG. 7 is a graph showing a profile of friction coefficient versus operating distance of a digital pen slid on a transparent film obtained in Comparative Example 5.

FIG. 8 is a graph showing a profile of friction coefficient versus operating distance of a digital pen slid on a transparent film obtained in Comparative Example 6.

FIG. 9 is a graph showing a profile of friction coefficient versus operating distance of a digital pen slid on a transparent film obtained in Comparative Example 7.

FIG. 10 is a graph showing a profile of friction coefficient versus operating distance of a digital pen slid on a transparent film obtained in Comparative Example 8.

FIG. 11 is a graph showing a profile of friction coefficient versus operating distance of a digital pen slid on a transparent film obtained in Example 1.

FIG. 12 is a graph showing a profile of friction coefficient versus operating distance of a digital pen slid on a transparent film obtained in Example 2.

FIG. 13 is a graph showing a profile of friction coefficient versus operating distance of a digital pen slid on a transparent film obtained in Example 3.

FIG. 14 is a graph showing a profile of friction coefficient versus operating distance of a digital pen slid on a transparent film obtained in Example 4.

FIG. 15 is a graph showing a profile of friction coefficient versus operating distance of a digital pen slid on a transparent film obtained in Example 5.

FIG. 16 is a graph showing a profile of friction coefficient versus operating distance of a digital pen slid on a transparent film obtained in Example 6.

FIG. 17 is a graph showing a profile of friction coefficient versus operating distance of a digital pen slid on a transparent film obtained in Example 7.

DESCRIPTION OF EMBODIMENTS

[Transparent Film]

The transparent film of the present invention contains a coat layer and is disposed on a display with the coat layer facing outward. The transparent film is usually a laminated film containing a transparent substrate film and a coat layer on (or over) at least one side of the substrate film. The coat layer, which is located at the outermost side of the display, allows the profile of friction coefficient versus operating distance to be substantially constant between the beginning (initial stage) and the midst of pen-input operation (during pen-input operation). Thus, the use of the transparent film for a display of a pen-input touch panel allows smooth input (or writing) similar to writing on paper with a pencil.

(Transparent Substrate Film)

Transparent substrate film is formed from a transparent material. The transparent material can be selected according to purposes and may be an inorganic material, such as a glass. In light of strength, formability (moldability), or other characteristics, an organic material may practically be used. The organic material may include, for example, a polymer, such as a cellulose derivative, a polyester resin, a polyamide resin, a polycarbonate resin, or a (meth)acrylic resin. Among them, a practically used one includes a cellulose ester, a polyester resin, and others.

The cellulose ester may include, for example, a cellulose acetate [such as a cellulose triacetate (TAC)] and a cellulose acetate $C_{3-4}$acylate (such as a cellulose acetate propionate or a cellulose acetate butyrate). The polyester may include, for example, a poly(alkylene arylate), such as a poly(ethylene terephthalate) (PET) or a poly(ethylene naphthalate) (PEN).

Among them, a poly($C_{2-4}$alkylene arylate), such as a PET or a PEN, is preferred. In light of heat resistance, a poly($C_{2-4}$alkylene naphthalate) resin, such as a PEN, is particularly preferred. Further, the substrate film formed from the organic material may be a biaxially stretched film.

The transparent substrate film may optionally contain an additive, e.g., a stabilizer (such as an antioxidant, an ultraviolet absorber, a light stabilizer, or a heat stabilizer), a nucleation agent, a plasticizer, and an antistatic agent. These additives may be used alone or in combination.

The transparent substrate film may have a thickness selected from the range of about 10 µm to 1 mm according to purposes. For example, the transparent substrate film may have a thickness of about 10 to 500 µm, preferably about 20 to 300 µm, and more preferably about 30 to 200 µm.

(Coat Layer)

The coat layer has a moderate uneven structure. The coat layer has a surface having a maximum height of rolling circle waviness profile ($W_{EM}$) in accordance with JIS B0610 of not less than 15 µm (for example, about 15 to 100 µm), e.g., about 15 to 50 µm, preferably about 16 to 45 µm, and more preferably about 17 to 40 µm (particularly about 17.5 to 38 µm). According to the present invention, due to the $W_{EM}$ adjusted within the range mentioned above, the input operation on the coat layer located at the outermost side of the pen-input touch panel display with a plastic pen (for example, a pen made of a polyoxymethylene) allows substantially constant writing smoothness during the pen-input operation (or between the beginning and the midst of pen-input operation) probably because the pen tip scratches moderately. In a case where the coat layer has an excessively low $W_{EM}$, the pen tip badly scratches without sliding on the pen-input touch panel display and is uncomfortable to use.

In the present description, the maximum height of rolling circle waviness profile ($W_{EM}$) can be measured in accordance with JIS B0610, more specifically, can be measured by a method described in Examples mentioned below.

The coat layer (in particular, a coat layer containing a thermoplastic elastomer) has a surface with projections, each having a height of not less than 1.0 µm, and the number of the projections is about 30 to 200/mm$^2$, for example, about 40 to 180/mm$^2$, preferably about 45 to 150/mm$^2$, and more preferably about 50 to 130/mm$^2$ (particularly about 70 to 120/mm$^2$). According to the present invention, the display of the pen-input touch panel allows substantially constant writing smoothness with a plastic pen (for example, a pen made of a polyoxymethylene) during the pen-input operation (or between the beginning and the midst of the pen-input operation) probably because the pen tip scratches for each projection at moderate intervals due to the number of the projections within such a range. In a case where the number of projections, each having a height of not less than 1.0 µm, is too small, the pen tip scratches badly without sliding on the display of the pen-input touch panel and is uncomfortable to use. In contrast, in a case where the number of the projections is too large, the frictional resistance between the pen and the display (or the coat layer) decreases in the process of the pen-input operation (specifically, the frictional resistance at the midst in the pen-input operation is smaller than that at the beginning in the pen-input operation), so that the pen tip slides (or slips) too much. Thus the coat layer has a difficulty in delicate pen-input operation and fails to be applicable to a highly functional touch panel.

The projections, each having a height of not less than 1.0 µm, on the surface of the coat layer (in particular, a coat layer containing a thermoplastic elastomer) may have an average height of not less than 3.5 µm, and, for example, has an average height of about 3.5 to 10 µm, preferably about 3.6 to 8 µm (e.g., about 3.8 to 6 µm), and more preferably about 3.9 to 5.5 µm (particularly about 4 to 5 µm). According to the present invention, the input operation on the display of the pen-input touch panel with a plastic pen allows substantially constant writing smoothness during the pen-input operation (or between the beginning and the midst of the pen-input operation) probably because the pen tip of the plastic pen scratches (or catches) for each projection certainly and moderately due to the average height of the projections within such a range. That is, the combination of the number of the projections with the average height thereof allows substantially constant writing smoothness during the pen-input operation (between the beginning and the midst of the pen-input operation) probably because the pen tip scratches (or catches) for each projection certainly and moderately at moderate intervals. Thus the coat layer can provide smooth writing similar to writing on paper with a pencil. In a case where the projections, each having a height of not less than 1.0 µM, have an excessively low average height, the pen tip tends to slide (or slip) too much on the coat layer. In a case where the projections have an excessively high average height, the pen tip scratches too much.

The coat layer (in particular, a coat layer containing a thermoplastic elastomer) has a surface with projections, each having a height of not less than 2.0 µm, and the number of the projections is, for example, about 10 to 150/mm$^2$, preferably about 20 to 120/mm$^2$, and more preferably about 30 to 100/mm$^2$ (particularly about 50 to 80/mm$^2$). In a case where the number of projections, each having a height of not less than 2.0 µm, is too small, the pen tip scratches too much on the display of the pen-input touch panel. In contrast, in a case where the number of the projections is too large, the frictional resistance between the pen and the display (or the coat layer) decreases in the process of the pen-input operation (specifically, the frictional resistance at the midst in the pen-input operation is smaller than that at the beginning in the pen-input operation), so that the pen tip slides (or slips) too much.

The projections, each having a height of not less than 2.0 µm, on the surface of the coat layer (in particular, a coat layer containing a thermoplastic elastomer) has an average height of, for example, about 4 to 15 µm, preferably about 4.5 to 10 µm, and more preferably about 4.8 to 8 µm (particularly about 5 to 6 µm). In a case where the projections, each having a height of not less than 2.0 µm, have an excessively low average height, the pen tip tends to slide (or slip) too much on the coat layer. In a case where the projections have an excessively high average height, the pen tip scratches too much.

In the present description, the number of projections and the average height thereof can be measured by particle analysis at a threshold of 1 µm or 2 µm using a non-contact surface profile (texture) measuring apparatus, more specifically, can be measured by a method described in Examples mentioned below.

The coat layer has a thickness (average thickness) of, for example, about 1 to 100 µm, preferably about 1.5 to 50 µm, and more preferably about 2 to 20 µm (particularly about 3 to 15 µm). For example, the thickness of the coat layer can be measured as the average value of any 10 points using an optical thickness meter.

Non-limiting examples of the process for producing the coat layer having such a surface profile (or texture) may include a process using a forming die. In light of convenience, a process using a particle (or a fine particle) is preferred. The coat layer obtained by the process using a particle may contain the particle and a binder component.

(A) Particle

The shape of the particle may include a spherical form, an ellipsoidal form, a polygonal form (e.g., a polyangular-pyramid form, a cubic form, and a rectangular-prism form), a plate-like form, a rod-like form, and an amorphous form. Among these shapes, in order that a pen tip may moderately catch the coat layer and allow smooth writing (feeling) similar to writing on paper with a pencil, the particle preferably has a form free from an acutely-angled portion (for example, a spherical form or an ellipsoidal form). In particular, the particle preferably has a truly spherical form or a substantially truly spherical form.

In order to form the above-mentioned uneven structure on the surface of the coat layer, the size (or diameter) of the particle can suitably be selected depending on a viscosity of a coating liquid for the coat layer. In light of easy formation of the uneven structure, the particle size is preferably substantially the same size as the thickness of the coat layer or larger than the thickness of the coat layer. Specifically, the average particle size of the particle can be selected from the range of about 0.5 to 10 times as large as the thickness of the coat layer. For example, the average particle size of the particle may be about 0.8 to 5 times (e.g., about 1 to 5 times), preferably about 0.9 to 4 times, and more preferably about 1 to 3 times (particularly about 1.1 to 2.5 times) as large as the thickness of the coat layer.

The particle has an average particle size of, for example, not less than 10 μm (e.g., about 10 to 100 μm), preferably about 11 to 50 μm, and more preferably about 12 to 40 μm (particularly about 13 to 30 μm). In a case where the average particle size is too large, the surface of the coat layer is scratchier and has low mechanical properties (such as strength) probably because the coat layer has an increased frictional force due to a larger surface roughness thereof. In contrast, in a case where the average particle size is too small, the sliding (or slippage) on the coat layer is too much. The average particle size can be measured by a method using laser diffraction.

The particle preferably has a narrow particle size distribution in order that a small amount of the particle may form an objective uneven profile and improve the transparency and mechanical strength of the coat layer. The particle size distribution of the particle is represented by a CV value (coefficient of correlation: the ratio of standard deviation relative to average particle size). The CV value may be not more than 20%, and is, for example, about 1 to 18%, preferably about 2 to 17%, and more preferably about 3 to 15% (particularly about 4 to 10%).

As far as the particle can have the above-mentioned average particle size and form a moderate uneven profile on the surface of the coat layer, the particle may include, but should not be limited to, an inorganic particle or an organic particle.

The inorganic particle may include, for example, a metal as a simple substance, a metal oxide, a metal sulfate, a metal silicate, a metal phosphate, a metal carbonate, a metal hydroxide, a silicon compound, a fluorine compound, and a natural mineral substance. The inorganic particle may be surface-treated with a coupling agent (a titanium coupling agent, a silane coupling agent). These inorganic particles maybe used alone or in combination. Among these inorganic particles, in light of transparency or others, a metal oxide particle (such as titanium oxide), a silicon compound particle (such as silicon oxide), or a fluorine compound particle (such as magnesium fluoride) is preferred; in order to obtain low reflection or low haze, a silica particle is particularly preferred.

The organic particle may include, for example, a particle of a thermoplastic resin (e.g., an acrylic resin, a polyamide resin, a polyamideimide resin, and a polyacetal resin), a particle of a crosslinked thermoplastic resin (e.g., a crosslinked polyolefinic resin, a crosslinked acrylic resin or a crosslinked (meth)acrylic resin, a crosslinked polystyrene-series resin, and a crosslinked polyurethane resin), and a particle of a thermosetting resin (e.g., an epoxy resin). These organic particles may be used alone or in combination. Among these organic particles, a widely used one includes a polyamide particle, a crosslinked polymer particle (such as a crosslinked acrylic resin or a crosslinked poly(meth)acrylate particle, a crosslinked polystyrene-series particle, or a crosslinked polyurethane particle), and others.

In light of well-balanced scratchy feeling and smoothness, the organic particle is preferred. In order to reduce the haze and obtain well-balanced optical characteristics and mechanical strength, a crosslinked poly(meth)acrylate-series particle is particularly preferred.

The poly(meth)acrylate constituting the crosslinked poly(meth)acrylate particle may include a poly(alkyl(meth)acrylate)resin containing a poly($C_{1-6}$alkyl(meth)acrylate), such as a poly(methyl(meth)acrylate), a poly(ethyl(meth)acrylate), or a poly(butyl(meth)acrylate) [particularly a poly($C_{2-6}$ alkyl(meth)acrylate)] as a main component (in a proportion of about 50 to 100% by weight, preferably about 70 to 100% by weight). The crosslinking agent may include a commonly used crosslinking agent, for example, a compound having two or more ethylenic unsaturated bonds [e.g., a (poly)$C_{2-10}$alkylene glycol di(meth)acrylate (such as ethylene glycol di(meth)acrylate, butanediol di(meth)acrylate, or a poly(ethylene glycol)di(meth)acrylate), a di-functional vinyl compound (such as divinylbenzene), and a tri- or more-functional (poly-functional) vinyl compound (such as trimethylolpropane tri(meth)acrylate)]. The proportion of the crosslinking agent may be about 0.1 to 10% by mol (particularly about 1 to 5% by mol) in the total monomer. In order to improve the sliding property of the coat layer, the crosslinked poly(meth)acrylate particle may include a crosslinked polymethacrylate particle, such as a crosslinked poly(methyl methacrylate) particle. Moreover, the crosslinked polyacrylate particle may be used in order to improve the softness of the coat layer.

In light of improvement in transparency, the particle may have a refraction index of, for example, about 1.4 to 1.6, preferably about 1.41 to 1.58, and more preferably about 1.42 to 1.55 (particularly about 1.45 to 1.53).

The particle preferably has a predetermined hardness. Assuming that the strength at which the particle is compressed by 10% using a micro compression tester represents S10 strength, the particle has the S10 strength of about 0.1 to 10 kgf/mm$^2$, preferably about 0.5 to 8 kgf/mm$^2$, and more preferably about 1 to 5 kgf/mm$^2$ (particularly about 1.5 to 3 kgf/mm$^2$).

The ratio of the particle relative to 100 parts by weight of the binder component (for example, the total amount of a vinyl-series compound and a thermoplastic elastomer) is, for example, about 1 to 50 parts by weight, preferably about 1.5 to 30 parts by weight, and more preferably about 2 to 15 parts by weight (particularly about 3 to 10 parts by weight). A coat layer containing the particle at an excessively low ratio tends to cause too much slippage. A coat layer containing the particle at an excessively high ratio has low mechanical properties and an increased haze.

(B) Binder Component

It is sufficient that the binder component can fix the particle in the coat layer. The binder component may include an inorganic binder component or an organic binder component. In light of strong fixation of the particle, or other reasons, the organic binder component is preferred. Further, among the organic binder components, an organic binder component containing at least a vinyl-series compound is preferred in light of excellent film-formability, strong fixation of the particle, and excellent film strength (such as abrasion resistance).

(B1) Vinyl-Series Compound

As the vinyl-series compound, a (meth)acrylate having not less than 2 (e.g., about 2 to 8) (meth)acryloyl groups in a molecule thereof may practically be used. For example, the vinyl-series compound may include a di- to octa-functional (meth)acrylate, a di- or more-functional oligomer or resin, and others.

The di-functional (meth)acrylate may include, for example, an alkanediol di(meth)acrylate, such as ethylene glycol di(meth)acrylate or 1,4-butanediol di(meth)acrylate; an alkanepolyol di(meth)acrylate, such as glycerin di(meth) acrylate; a polyalkylene glycol di(meth)acrylate, such as diethylene glycol di(meth)acrylate; a di(meth)acrylate of an adduct of a bisphenol with an $C_{2-4}$alkylene oxide; and a crosslinked cyclic di(meth)acrylate, such as adamantane di(meth)acrylate.

The tri- or more-functional (about tri- to octa-functional) (meth)acrylate may include, for example, an esterification product of a polyhydric alcohol and (meth)acrylic acid, e.g., glycerin tri(meth)acrylate, trimethylolpropane tri(meth) acrylate, pentaerythritol tri(meth)acrylate; ditrimethylolpropane tetra(meth)acrylate, pentaerythritol tetra(meth)acrylate; dipentaerythritol penta(meth)acrylate; and dipentaerythritol hexa(meth)acrylate. Further, in these polyfunctional (meth)acrylates, the polyhydric alcohol may be an adduct of an alkylene oxide (for example, a $C_{2-4}$alkylene oxide, such as ethylene oxide). These poly-functional (meth) acrylates may be used alone or in combination.

The di- or more-functional oligomer or resin may include, for example, a urethane(meth)acrylate, an epoxy(meth)acrylate, a polyester(meth)acrylate, and a silicone(meth)acrylate. Among them, from the viewpoint of easy control of the mechanical properties of the coat layer, a urethane(meth) acrylate is practically used.

Among these vinyl-series compounds, in light of the strong fixation of the particle and the improvement in the sliding property of the flat portion of the surface of the coat layer, a tri- or more-functional (particularly a tetra- to octa-functional) (meth)acrylate, such as dipentaerythritol penta(meth)acrylate or dipentaerythritol hexa(meth)acrylate, is preferred.

The weight-average molecular weight of the vinyl-series compound is not particularly limited to a specific one. In light of improvement in the touch (feel or texture) of the coat layer, the vinyl-series compound may have a weight-average molecular weight of not less than 500, for example, about 500 to 10000, preferably about 600 to 9000, and more preferably about 700 to 8000 (particularly about 1000 to 5000) in terms of polystyrene in gel permeation chromatography (GPC). A vinyl-series compound having an excessively low molecular weight makes the touch of the coat layer poor. A vinyl-series compound having an excessively high molecular weight has a low film-formability of the coat layer or is hard to handle.

(B2) Thermoplastic Elastomer

In order to improve the film softness or the film-formability, the binder component may further contain a thermoplastic elastomer in addition to the above-mentioned vinyl-series compound.

The thermoplastic elastomer may include, for example, a styrene-series elastomer, an olefinic elastomer, a polyester-series elastomer, and a polyamide-series elastomer. In light of adhesion, flexibility, and others, a thermoplastic polyurethane elastomer is preferred. The thermoplastic polyurethane elastomer can be obtained by a reaction of a polyisocyanate and a polyol and optionally a chain-elongation agent (or chain-extension agent).

As the polyisocyanate, there may be used a conventional polyisocyanate, and others. For example, a preferred one may include a non-yellowing diisocyanate or a derivative thereof, e.g., an aliphatic diisocyanate (such as hexamethylene diisocyanate (HDI)) and an alicyclic diisocyanate [such as isophorone diisocyanate (IPDI) or hydrogenated xylylene diisocyanate (hydrogenated XDI)]. In particular, a trimer of an aliphatic diisocyanate (e.g., a trimer having an isocyanurate ring) may preferably be used.

As the polyol, there may be used a conventional polymer polyol, and others. In general, a polyether polyol, a polyester polyol, or a polycarbonate polyol is practically used.

As the polyether polyol, there may preferably be used, for example, a ring-opening polymerization product or copolymer of an oxirane compound [for example, a poly($C_{2-4}$ alkylene glycol), such as a poly(ethylene glycol), a poly (propylene glycol), a poly(trimethyleneether glycol), or a poly(tetramethyleneether glycol)] and an adduct of bisphenol A or hydrogenated bisphenol A with an alkylene oxide.

The polyester polyol may be a reaction product of a polycarboxylic acid (or an anhydride thereof) and a polyol, or may be a reaction product obtainable by ring-opening addition polymerization of a lactone.

As the polycarboxylic acid, there may be used a conventional polycarboxylic acid, and others. For example, a preferred one may include an aliphatic dicarboxylic acid or an anhydride thereof (e.g., a $C_{6-20}$alkanedicarboxylic acid, such as adipic acid, azelaic acid, or sebacic acid).

As the polyol, there may be used a conventional polyol, and others. A preferably available polyol may include an aliphatic diol [e.g., an alkanediol (a $C_{2-22}$alkanediol, such as ethylene glycol, propylene glycol, trimethylene glycol, 1,4-butanediol, 1,5-pentanediol, neopentyl glycol, or 1,6-hexanediol)], an alicyclic diol [e.g., a cycloalkanediol (such as 1,4-cyclohexanediol or 1,4-cyclohexane dimethanol), a hydrogenated bisphenol (such as hydrogenated bisphenol A) or a $C_{2-4}$alkylene oxide adduct thereof].

The lactone to be used may include a conventional lactone, and others. A preferably usable lactone may include a $C_{4-8}$lactone, such as valerolactone or caprolactone.

The polycarbonate polyol may include, for example, a polymer of a glycol and a carbonate or phosgene. The glycol may include one or more glycols selected from the group consisting of an alkanediol (e.g., ethylene glycol, propylene glycol, 1,4-butanediol, 1,5-pentanediol, 1,6-hexanediol, and neopentyl glycol), a (poly)oxyalkylene glycol (e.g., diethylene glycol and dipropylene glycol), an alicyclic diol (e.g., 1,4-cyclohexanediol, 1,4-cyclohexane dimethanol, and hydrogenated bisphenol A), and an aromatic diol (e.g., a bisphenol (such as bisphenol A) or an adduct of a bisphenol with an alkylene oxide). The carbonate may include dimethyl carbonate, ethylene carbonate, and diphenyl carbonate.

As the chain-elongation agent, there may be used a conventional chain-elongation agent. For example, a preferably available chain-elongation agent may include a diol (e.g., an alkanediol, such as ethylene glycol or 1,4-butanediol) and a diamine (e.g., tetramethylenediamine and hexamethylenediamine).

The polyurethane elastomer may be an elastomer containing a hard segment (hard block) and a soft segment (soft block); the hard segment may contain a polyurethane of a short-chain diol and a diisocyanate, and the soft segment may contain a polyurethane of a polymer diol (such as a polyester diol, a polyether diol, or a polycarbonate diol) and a diisocyanate. The polyurethane elastomer is usually classified into a polyester-based polyurethane elastomer, a polyether-based polyurethane elastomer, a polycarbonate-based polyurethane elastomer, and others, according to the species of the polymer diol constituting the soft segment.

Among these thermoplastic polyurethane elastomers, in light of softness, stability, or others, a preferred one may include a polyester-based polyurethane elastomer, a polyether-based polyurethane-series elastomer, and a polycarbonate polyol (in particular, a polyester-based polyurethane-series elastomer containing a non-yellowing diisocyanate, a polycarbonate polyol).

The thermoplastic polyurethane elastomer may be modified with a silicone component. The silicone component may be contained in the elastomer or may be copolymerized with a monomer constituting the elastomer. The silicone component is usually formed from an organosiloxane unit [—Si(—R)$_2$—O—] (wherein the group R represents a substituent). The substituent represented by the group R may include an alkyl group (such as methyl group), an aryl group (such as phenyl group), a cycloalkyl group, and others. The proportion of the silicone component in the whole silicone-modified polyurethane elastomer is about not more than 60% by weight, for example, about 0.1 to 50% by weight, preferably about 1 to 40% by weight, and more preferably about 2 to 30% by weight (particularly about 3 to 20% by weight).

The thermoplastic elastomer (in particular, a thermoplastic polyurethane elastomer) may have a number-average molecular weight of, for example, about 10,000 to 500,000, preferably about 20,000 to 300,000, and more preferably about 30,000 to 100,000 in terms of polystyrene in GPC.

The ratio (weight ratio) of the vinyl-series compound relative to the thermoplastic elastomer is about 1/99 to 70/30, preferably about 10/90 to 50/50, and more preferably about 20/80 to 45/55 (particularly about 30/70 to 40/60) as the former/the latter. In a case where the ratio of the thermoplastic elastomer is too low, the coat layer has less-improved softness or film-formability. In a case where the ratio of the thermoplastic elastomer is too high, the coat layer is tacky and has a large frictional resistance.

(B3) Other Additives

In a case where the binder component contains the vinyl-series compound, the binder component may contain a polymerization initiator. The polymerization initiator may be a thermal polymerization initiator [a thermal radical generator, such as a peroxide (e.g., benzoyl peroxide)] or may be a photopolymerization initiator (a photo radical generator). A preferred polymerization initiator includes a photopolymerization initiator. The photopolymerization initiator may include, for example, an acetophenone compound or propiophenone compound, a benzil compound, a benzoin compound, a benzophenone compound, a thioxanthone compound, and an acylphosphine oxide compound. The photopolymerization initiator may contain a commonly used photosensitizer or photopolymerization accelerator (for example, a tertiary amine). The ratio of the photopolymerization initiator relative to 100 parts by weight of the vinyl-series compound may be about 0.1 to 20 parts by weight, preferably about 0.5 to 10 parts by weight, and more preferably about 1 to 8 parts by weight (particularly about 1 to 5 parts by weight).

The binder component may further contain a commonly used additive, if necessary. Examples of the additive may include another particle, another thermoplastic polymer, a stabilizer (e.g., an antioxidant, an ultraviolet absorber, a light stabilizer, and a heat stabilizer), a flame retardant, a flame-retardant auxiliary, a filler, a plasticizer, an impact modifier, a reinforcer, a dispersing agent, an antistatic agent, and an antibacterial agent. These additives may be used alone or in combination.

In light of coatability and others, it is preferred that the binder component further contain a solvent. The solvent can be selected according to the species and solubility of the binder component (such as the vinyl-series compound or the thermoplastic elastomer). It is sufficient that at least a solid content can be uniformly dissolved in the solvent. The solvent may include, for example, a ketone, an ether, a hydrocarbon, an ester, water, an alcohol, a cellosolve, a sulfoxide, and an amide. These solvents may be used alone or in combination. The solvent may be a mixed solvent. Among these solvents, a practically used one includes an alcohol (such as isopropanol), an ester (such as ethyl acetate), and an aromatic hydrocarbon (such as toluene).

The binder component containing the vinyl-series compound may be a thermosetting composition or may be a photo-curable compound that can harden in a short time, for example, an ultraviolet-curable compound and an EB-curable compound. In particular, a practically usable composition includes an ultraviolet-curable resin.

(Characteristics of Transparent Film)

The transparent film of the present invention has a moderate (or suitable) hardness and a hardcoat function, and the transparent film enables smooth writing on a pen-input touch panel similar to writing on paper with a pencil. The coat layer of the transparent film has a pencil hardness (at a load of 750 gf) of, for example, not less than B, preferably not less than HB, and more preferably about F to 4H (particularly about H to 3H). In a case where the coat layer has an excessively high hardness, the pen tip tends to slide on the coat layer too much. In a case where the coat layer has an excessively low hardness, the pen tip unnecessarily catches the coat layer.

The transparent film of the present invention has not only such a surface hardness but also a transparency necessary for a display. Specifically, the transparent film of the present invention may have a total light transmittance in accordance with JIS K7136 of not lower than 85%, for example, of about 85 to 99.9%, preferably about 86 to 99.5%, and more preferably about 88 to 99% (particularly about 90 to 95%). Further, the transparent film of the present invention (in particular, a transparent film that has an anti-glare layer containing a thermoplastic elastomer) has a moderate (or suitable) uneven structure on a surface thereof and a high total light transmittance. The transparent film may have a total light transmittance of about 91 to 99% (e.g., about 91.5 to 98%), preferably about 92 to 97%, and more preferably about 92.5 to 96% (particularly about 93 to 95%).

Further, the transparent film of the present invention has a moderate (or suitable) haze that can provide anti-glareness or anti-Newton-ring properties. For example, the haze in accordance with JIS K7136 can be selected from the range of about 1 to 99%, and, for example, may be about 2 to 95%. The haze can further be controlled by adjusting the composition ratio in the coat layer. For an application with serious transparency, the haze may be adjusted to not more than 50% by reducing the ratio of the particle. The haze may be, for example, not more than 40% (e.g., about 1 to 40%), preferably about 5 to 35%, and more preferably about 10 to 30%. For an application without serious transparency, the haze may be not more than 80% (e.g., about 20 to 80%), preferably not more than 70% (e.g., about 30 to 70%), and more preferably not more than 60% (e.g., about 40 to 60%).

The transparent film of the present invention may be used in combination with other functional layers, for example, a transparent conductive layer, an anti-Newton-ring layer, an anti-glare layer, a light-scattering layer, an anti-reflection layer, a polarizing layer, and an optical retardation layer (or a phase layer).

The transparent film of the present invention is utilizable for a display of a touch panel (in particular, a pen-input touch panel or a pen touch panel) and is disposed so that the coat layer, which enables an excellent writing (touch) with a pen, may be located at the outermost side of the display. The coat layer allows substantially constant writing smoothness between the beginning and the midst of pen-input operation and enables smooth input (writing) similar to writing on paper with a pencil. Thus the transparent film is suitable for operation of displays of various pen-input touch panels (in particular, a projected capacitive touch panel of ITO grid system).

The pen (contactor) for the pen-input touch panel is made of a hard material (such as a plastic or a metal), and is usually made of a plastic. In light of strength or durability, the plastic may include, for example, a polyacetal resin, an aromatic polyester resin, a polyamide resin, a polycarbonate resin, a poly(phenylene ether) resin, a poly(phenylene sulfide) resin, and a polysulfone-series resin. These resins may be used alone or in combination. Among them, a preferred one includes a polyacetal resin (such as a polyoxymethylene) from the viewpoint of lightness in weight, high strength, excellent durability (such as abrasion resistance) or sliding property. The shape of the pen tip is not particularly limited to a specific one. The pen tip usually has a curved surface (a rounded shape). The average diameter of the pen tip is not particularly limited to a specific one. The average diameter of the pen tip can be selected from the range of, for example, about 0.1 to 10 mm and is preferably about 0.3 to 8 mm, more preferably about 0.3 to 5 mm, and usually about 0.5 to 3 mm (particularly about 0.6 to 2 mm).

[Process for Producing Transparent Film]

The transparent film of the present invention can be obtained by applying a polymerizable composition on at least one side of a substrate film and then curing the composition.

The method of applying (or coating) the polymerizable composition may include a conventional method, for example, a roll coater, an air knife coater, a blade coater, a rod coater, a reverse coater, a bar coater, a comma coater, a dip and squeeze coater, a die coater, a gravure coater, a microgravure coater, a silkscreen coater, a dipping method, a spraying method, and a spinner method. Among these methods, a bar coater or a gravure coater is practically used. If necessary, the polymerizable composition may be applied a plurality of times.

In a case where the polymerizable composition contains an organic solvent, or other cases, a drying step may optionally be conducted after the applying step. The drying may be carried out at a temperature of, for example, about 40 to 150° C., preferably about 50 to 120° C., and more preferably about 60 to 100° C.

The method to be used for forming the moderate uneven structure on the coat layer, may include a method of adjusting the thickness of the polymerizable composition (the coating) and the size (or diameter) of the particle, or a method of adjusting the viscosity of the coating liquid. The method of adjusting the thickness of the coating and the size of the particle may use a particle having a size larger than the thickness of the coating. The moderate uneven structure may be obtained by the method of adjusting the viscosity of the coating liquid, for example, by adding a high-viscosity component (such as a thermoplastic elastomer) for hardly precipitating the particle in the coating liquid. Specifically, the adjustment of the viscosity allows the formation of the moderate uneven structure, for example, even in a case where the thickness of the coating is substantially or about the same as the size of the particle. In particular, the uneven structure having relatively high projections can also be formed by adjusting the viscosity at a higher level. Moreover, the size of waviness or the height of projections maybe adjusted by combining the above-mentioned methods to adjust the size of the particle and the viscosity of the coating liquid.

In the curing step, the polymerizable composition may be cured by heating according to the species of the polymerization initiator, and can usually be cured by irradiation with an active energy ray (or actinic ray). As the active energy ray, for example, there may be used a radioactive ray (such as gamma ray or X-ray), an ultraviolet ray, a visible ray, and an electron beam (EB). The active energy ray is usually an ultraviolet ray or an electron beam in practical cases.

For the ultraviolet ray, the light source may include, for example, a Deep UV lamp, a low-pressure mercury lamp, a high-pressure mercury lamp, a super high-pressure mercury lamp, a halogen lamp, and a laser light source (a light source, such as a helium-cadmium laser or an excimer laser). The quantity of the irradiation light (irradiation energy) varies depending on the thickness of the coating. The quantity of the irradiation light may for example be about 50 to 10000 mJ/cm$^2$, preferably about 70 to 7000 mJ/cm$^2$, and more preferably about 100 to 5000 mJ/cm$^2$.

For the electron beam, an exposure source (e.g., an electron beam irradiation apparatus) can be used for the electron beam irradiation. The radiation dose (dose) varies depending on the thickness of the coating. The radiation dose is, for example, about 1 to 200 kGy (kilogray), preferably about 5 to 150 kGy, and more preferably about 10 to 100 kGy (particularly about 20 to 80 kGy). The acceleration voltage is, for example, about 10 to 1000 kV, preferably about 50 to 500 kV, and more preferably about 100 to 300 kV.

The irradiation with the active energy ray may optionally be conducted in an atmosphere of an inactive gas (for example, nitrogen gas, argon gas, and helium gas).

In order to improve the adhesion of the coat layer to the substrate film, the coat layer may be subjected to a surface treatment. The surface treatment may include a conventional surface treatment, for example, a corona discharge treatment, a flame treatment, a plasma treatment, and an ozone or ultraviolet ray irradiation treatment. The surface of the substrate film may be subjected to an easy-adhesion treatment.

EXAMPLES

The following examples are intended to describe this invention in further detail and should by no means be interpreted as defining the scope of the invention. The transparent films obtained in Examples and Comparative Examples were evaluated for the following items.

[Average Particle Size of Particle]

A scanning electron microscopic (SEM) photograph of particles (dry state) was subjected to two-dimensional processing, and the average particle size of the particles was calculated. Specifically, a rectangular form having any size was drawn on the resulting SEM photographic image so that at least 200 particles existed within the rectangular form, and the particle sizes of all particles existing within the rectangular form were measured in terms of spheres. Based on the resulting at least 200 particle sizes, the average particle size was calculated.

[Maximum Height of Rolling Circle Waviness Profile ($W_{EM}$)]

In accordance with JIS B0610, the maximum height of rolling circle waviness profile ($W_{EM}$) was measured using a surface texture and contour measuring instrument ("SURFCOM 570A" manufactured by Tokyo Seimitsu Co., Ltd.) under the following conditions.

Stylus: Waviness (0102505)
Specification of stylus: 800 μmR, ruby
Driving speed: 3 mm/s
λf reduction cut-off value: 8 mm
Measuring length: 15 mm

[Number and average height of projections]

The surface profile (texture) of the sample was measured using a non-contact surface texture measuring instrument ["VertScan 2.0" manufactured by Ryoka Systems Inc.]. Further, the analysis of particles with a height of not less than 1.0 μm (threshold: 1 μm) and those with a height of not less than 2.0 μm (threshold: 2 μm) was conducted using the observation image to determine the number of projections (particles projecting from the surface of the sample) and the average area. From these results, the number of projections per square millimeter was calculated, and the average of the highest points of projections (the average height) was determined. Incidentally, a lens having a magnifying power of 5 was used as an object lens, and the observation was performed in the field of view of 2507 μm×1881 μm.

[Optical Characteristics]

The haze and the total light transmittance (TPP) were measured using a haze meter (trade name "NDH-5000W" manufactured by Nippon Denshoku Industries Co., Ltd.) in accordance with JIS K7136.

[Pencil Hardness]

The pencil hardness was measured at a load of 750 gf in accordance with JIS K5400.

[SW Durability]

Using a durability tester provided with a stick 2.5 cm in a diameter covered with a #0000 steel wool, the steel wool was allowed to go back and forth on the sample 10 times under a load of 400 g. The degree of scratches on the sample was evaluated on the basis of the following criteria.

A: No scratches appear.
B: One or two scratches appear.
C: Three or more scratches appear.

[Durability Against Pen-Sliding]

Using a sliding tester for touch panel, a digital pen for Nintendo DS (registered trademark) was allowed to go back and forth on the sample 10000 times under a load of 500 g. The degree of scratches on the sample was evaluated on the basis of the following criteria.

A: No scratches appear.
B: One or two scratches appear.
C: Three or more scratches appear.

[Friction Coefficient]

The frictional force was measured under the measurement conditions (load: 50 gf, speed: 50 mm/sec.) using a static and dynamic friction measuring machine ("Handy TribomasterTL201Ts" manufactured by Trinity-Lab Inc.). A pen made of a polyoxymethylene (pen-tip diameter: 0.8 mmφ) was used as a contactor. The pen was allowed to slide at an angle of 45° to the film. As reference examples, each of pencils ("Uni 6B" and "Uni HB" manufactured by Mitsubishi Pencil Co., Ltd.) was allowed to slide on a paper ("Copy paper standard type" manufactured by Kaunet Co., Ltd.).

[Thickness of Coat Layer]

The thickness of the coat layer was measured at any 10 points using an optical thickness meter, and the average value was calculated.

[Components of Coat Layer]

Poly-functional acrylate: poly-functional acrylic UV-curable monomer (dipentaerythritol penta- to hexa-acrylate), "DPHA" manufactured by Daicel-Allnex Ltd.

Urethane acrylate: tri-functional urethane acrylate, "KRM8264" manufactured by Daicel-Allnex Ltd.

Urethane elastomer: polyurethane elastomer (carbonate-series polyurethane), "DAIALLOMER SP-2165" manufactured by Dainichiseika Color & Chemicals Mfg. Co., Ltd.

Acrylic particle (5 μm): "FH-S005" manufactured by Toyobo Co., Ltd., average particle size of 5 μm, crosslinked polymethacrylate particle Acrylic particle (10 μm): "FH-S010" manufactured by Toyobo Co., Ltd., average particle size of 10 μm, crosslinked polymethacrylate particle Acrylic particle (15 μm): "FH-S015" manufactured by Toyobo Co., Ltd., average particle size of 15 μm, crosslinked polymethacrylate particle Acrylic particle (27 μm): "Techpolymer SSX-127" manufactured by Sekisui Plastics Co., Ltd., average particle size of 27 μm, crosslinked polymethacrylate particle Monodisperse acrylic particle (15 μm): "Chemisnow MX-1500H" manufactured by Soken Chemical & Engineering Co., Ltd., average particle size of 13.5 to 16.5 μm, CV value of 5.0%, crosslinked polymethacrylate particle Monodisperse acrylic particle A (20 μm): "Techpolymer SSX120" manufactured by Sekisui Plastics Co., Ltd., average particle size of 20 μm, S10 strength of 2.56 kgf/mm$^2$, crosslinked poly(methyl methacrylate) particle Monodisperse acrylic particle B (20 μm): "Chemisnow MX-2000" manufactured by Soken Chemical & Engineering Co., Ltd., average particle size of 18 to 22 μm, CV value of 17.1%, crosslinked polymethacrylate particle Polyurethane particle: "DAIMICBEAZ 5070D" manufactured by Dainichiseika Color & Chemicals Mfg. Co., Ltd., average particle size of 7 μm Initiator 1: photopolymerization initiator, "Irgacure 184" manufactured by Ciba Japan K.K.

Initiator 2: photopolymerization initiator, "Irgacure 907" manufactured by Ciba Japan K.K.

Comparative Example 1

For a commercially available hardcoat film ("KB film N10" manufactured by Kimoto Co., Ltd.), the number and average height of projections, the optical characteristics, the pencil hardness, the SW durability, the durability against pen-sliding were measured. The results are shown in Table 1.

Comparative Examples 2 to 8 and Examples 1 to 7

In a mixed solvent of ethyl acetate and isopropanol (ethylacetate/isopropanol=6/4 (volume ratio)), the resin component(s) and resin particle(s) shown in Table 1, and initiator(s) were dissolved in the proportion shown in Table 1. Incidentally, each of the initiators was added at a ratio of 2.5 parts by weight relative to 100 parts by weight of the polymerizable monomer (the poly-functional acrylate and/or urethane acrylate). The solid concentration of the resulting composition was adjusted to 25% by weight.

The resulting liquid was cast on a poly (ethylene terephthalate) film ("A4300" manufactured by Toyobo Co., Ltd., thickness of 125 μm) with the use of a wire bar #38 and then allowed to stand for one minute in an oven at 60° C. Thereafter, the coated film passed through an ultraviolet irradiation equipment (manufactured by Ushio Inc., a high-pressure mercury lamp, dose of ultraviolet ray: 800 mJ/cm$^2$) for ultraviolet curing treatment to form a coat layer (dry thickness: 10 μm or 13 μm).

For the resulting transparent film, the $W_{EM}$, the number and average height of projections, the optical characteristics, the pencil hardness, the SW durability, and the durability against pen-sliding were measured. The results are shown in Table 1.

As apparent from the results shown in Table 1, the transparent films of Examples have moderate uneven surface structure and well-balanced optical characteristics and mechanical properties, compared with the transparent films of Comparative Examples.

Each of FIGS. 1 and 2 is a graph showing a profile of friction coefficient versus operating distance of a pencil slid on a paper. Each of FIGS. 3 to 17 is a graph showing a profile of friction coefficient versus operating distance on the transparent film obtained in each of Comparative Examples 1 to 8 and Examples 1 to 7. As apparent from the results shown in FIGS. 1 to 17, the transparent films of Examples have a substantially constant profile of friction coefficient versus operating distance between the beginning and the midst of pen-input operation, which is similar to the profile when the pencil was allowed to slide on the paper. In contrast, for the transparent films of Comparative Examples, there are some cases where the frictional resistance in the initial stage is larger, or there are some cases where the amplitude of the friction coefficient is small. Thus the profile

TABLE 1

| | | Comparative Examples | | | | | | | |
|---|---|---|---|---|---|---|---|---|---|
| | | 1 | 2 | 3 | 4 | 5 | 6 | 7 | 8 |
| Composition (parts by weight) | Poly-functional acrylate | — | 50 | 50 | 50 | 50 | 50 | 50 | 50 |
| | Urethane acrylate | — | — | — | — | — | — | — | 50 |
| | Urethane elastomer | — | 50 | 50 | 50 | 50 | 50 | 50 | — |
| | Acrylic particle 5 μm | — | 1 | 5 | 10 | 100 | — | — | — |
| | Acrylic particle 10 μm | — | — | — | — | — | 5 | — | — |
| | Acrylic particle 15 μm | — | — | — | — | — | — | 1 | — |
| | Acrylic particle 27 μm | — | — | — | — | — | — | — | — |
| | Monodisperse acrylic particle 15 μm | — | — | — | — | — | — | — | — |
| | Monodisperse acrylic particle A 20 μm | — | — | — | — | — | — | — | — |
| | Monodisperse acrylic particle B 20 μm | — | — | — | — | — | — | — | — |
| | Urethane particle 7 μm | — | — | — | — | — | — | — | 100 |
| Coat layer thickness (μm) | | — | 13 | 13 | 13 | 13 | 13 | 13 | 13 |
| $W_{EM}$ (μm) | | 10.68 | 8.55 | 8.57 | 6.05 | 13.75 | 13.94 | 13.97 | 8.83 |
| Average height of 1.0-μm projections (μm) | | 1.64 | 1.36 | 1.60 | 1.87 | — | 2.22 | 3.63 | — |
| 1.0-μm projections (number per mm$^2$) | | 22 | 1 | 13 | 39 | — | 78 | 12 | — |
| Average height of 2.0-μm projections (μm) | | 2.31 | — | 2.30 | 2.44 | — | 3.40 | 5.41 | — |
| 2.0-μm projections (number per mm$^2$) | | 0 | 0 | 1 | 1 | — | 8 | 4 | — |
| Haze (%) | | 16.4 | 3.8 | 14.7 | 38.5 | 94.2 | 21.2 | 5.6 | 93.9 |
| TPP (%) | | 88.7 | 91.2 | 90.6 | 92.4 | 87.1 | 90.9 | 91.1 | 92.8 |
| Pencil hardness | | 3H | F | B | 3H | 4H | — | F | HB |
| SW Durability | | A | C | C | B | — | C | B | C |
| Durability against pen-sliding | | A | A | A | A | A | A | A | A |

| | | Examples | | | | | | |
|---|---|---|---|---|---|---|---|---|
| | | 1 | 2 | 3 | 4 | 5 | 6 | 7 |
| Composition (parts by weight) | Poly-functional acrylate | 50 | 50 | 100 | 80 | 100 | 100 | 100 |
| | Urethane acrylate | — | — | — | — | — | — | — |
| | Urethane elastomer | 50 | 50 | — | 20 | — | — | — |
| | Acrylic particle 5 μm | — | — | — | — | — | — | — |
| | Acrylic particle 10 μm | — | — | — | — | — | — | — |
| | Acrylic particle 15 μm | 5 | 10 | — | — | — | — | — |
| | Acrylic particle 27 μm | — | — | 5 | — | — | — | — |
| | Monodisperse acrylic particle 15 μm | — | — | — | 3 | — | — | — |
| | Monodisperse acrylic particle A 20 μm | — | — | — | — | 5 | — | — |
| | Monodisperse acrylic particle B 20 μm | — | — | — | — | — | 3 | 5 |
| | Urethane particle 7 μm | — | — | — | — | — | — | — |
| Coat layer thickness (μm) | | 13 | 13 | 13 | 10 | 10 | 10 | 10 |
| $W_{EM}$ (μm) | | 18.29 | 17.81 | 37.29 | 22.09 | 27.48 | 29.04 | 33.23 |
| Average height of 1.0-μm projections (μm) | | 3.83 | 4.23 | — | — | — | — | — |
| 1.0-μm projections (number per mm$^2$) | | 49 | 99 | — | — | — | — | — |
| Average height of 2.0-μm projections (μm) | | 5.15 | 5.27 | — | — | — | — | — |
| 2.0-μm projections (number per mm$^2$) | | 24 | 76 | — | — | — | — | — |
| Haze (%) | | 27.0 | 49.6 | 15.1 | 12.0 | 17.5 | 19.8 | 29.0 |
| TPP (%) | | 92.3 | 93.1 | 90.1 | 91.3 | 90.4 | 89.7 | 90.0 |
| Pencil hardness | | 2H | 2H | 3H | 3H | 3H | 3H | 3H |
| SW Durability | | B | A | A | A | A | A | A |
| Durability against pen-sliding | | A | A | A | A | A | A | A | of the transparent films of Comparative Examples is considerably different from the profile when the pencil was allowed to slide on the paper.

INDUSTRIAL APPLICABILITY

The transparent film of the present invention is utilizable for displays of various optical display apparatus. For example, the transparent film is utilizable for a display (a display screen) of a touch panel (in particular, a projected capacitive touch panel of ITO grid system) that is used in combination with a display apparatus in a display unit of an electric or electronic equipment or precision equipment. The display apparatus may include, for example, a liquid crystal display apparatus, a plasma display apparatus, and an organic or inorganic EL display apparatus. The electric or electronic equipment or precision equipment may include, for example, a PC, a television, a mobile phone (a smartphone), an electronic paper, a game console, a mobile device, a clock or a watch, and an electronic calculator. In particular, since the transparent film allows smooth writing (or input) with a plastic pen, like writing on a paper with a pencil, the transparent film is useful for a display of a pen-input touch panel (e.g., a smartphone, a mobile phone, an electronic paper, a tablet PC, a pen tablet, a game console, and a PC).

The invention claimed is:

1. A transparent film comprising a transparent substrate film and a coat layer on at least one side of the substrate film, wherein the transparent film has a total light transmittance in accordance with JIS K7136 of not lower than 85%, and the coat layer has a surface with a maximum height of rolling circle waviness profile ($W_{EM}$) in accordance with JIS B0610 of not less than 15 μm.

2. A transparent film according to claim 1, wherein the coat layer comprises particles and a binder component, and the particles have an average particle size of 1 to 5 times as large as a thickness of the coat layer.

3. A transparent film according to claim 2, wherein the particles have a CV value of particle size of not larger than 20%.

4. A transparent film according to claim 1, wherein the coat layer has a surface with a maximum height of rolling circle waviness profile ($W_{EM}$) in accordance with JIS B0610 of 15 to 50 μm.

5. A transparent film according to claim 2, wherein the binder component comprises a thermoplastic elastomer.

6. A transparent film according to claim 5, wherein the coat layer has a surface with 30 to 200 projections, each having a height of not less than 1.0 μm, per square millimeter, and the projections have an average height of not less than 3.5 μm.

* * * * *